Jan. 31, 1939.    F. M. CLARK    2,145,710
CAPACITANCE DEVICE
Filed April 1, 1936

Inventor:
Frank M. Clark,
by Harry E. Dunham
His Attorney.

UNITED STATES PATENT OFFICE 2,145,710

CAPACITANCE DEVICE

Frank M. Clark, Pittsfield, Mass., assignor to General Electric Company, a corporation of New York Application April 1, 1936, Serial No. 72,095

19 Claims. (Cl. 175—315)

The present invention comprises improvements in electrolytic devices, including in particular capacitance devices such as electric condensers (capacitors), capacitance bushings and the like.

In accordance with one feature of my invention, a thin insulating resinous film is deposited on the anode of an electrolytic device in which the electrolyte may consist of an aqueous dispersion of a chemical complex or compound of a suitable strong base and a suitable resin (commonly natural resin), for example, a tree resin such as rosin, mastic, anime, dammar, sandarac or dragon's blood, also shellac and amber or kauri (fossil resins). Such resinous films may be formed on a foundation of non-filming base metal, such as copper, nickel, iron, tin, and the like or an alloy thereof. By "non-filming" metal I mean to designate a metal which is not capable of forming a current-blocking film of oxide (or hydroxide) in accordance with well known electrolytic phenomena to distinguish them from metals such as aluminum or tantalum, which are capable of forming current-blocking films by electrolytic hydration, or oxidation. The film-forming metals, however, also may be used as a foundation for films of resinous material in accordance with my invention. Metals coated with thin films of electrodeposited resin are capable of various uses other than for the fabrication of capacitance devices, including protective and decorative uses, as described in a copending application, Serial No. 72,094, filed April 1, 1936, by Frank M. Clark and Goldner F. Lipsey. This application is assigned to the same assignee as the present application.

My invention in one of its aspects comprises capacitors containing armatures of metal foil coated with a thin dielectric layer derived from a resin-containing electrolyte which is a dispersion or solution of resin. Such capacitors may be of the electrolytic type and contain a suitable electrolyte which may consist of a solution of hydrolyzed shellac, or other alkali-soluble resin.

Figure 1:
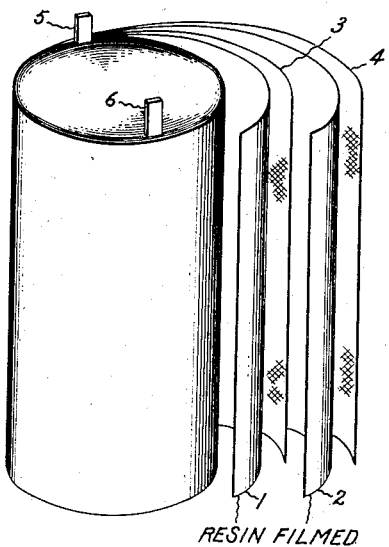
Figure 2:
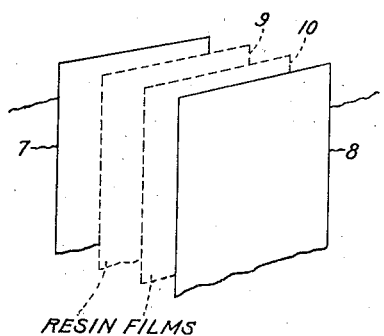

The accompanying drawing shows in Fig. 1 a roll-type capacitor and in Fig. 2 a stack-type capacitor as representative of capacitance devices to which my invention is applicable.

In the preparation of a resin-containing electrolyte a resin is dispersed or dissolved in water containing an alkaline material. Examples of alkaline reagents capable of use are sodium potassium or ammonium hydroxide, sodium, potassium or ammonium borate, sodium or potassium carbonate, or sodium or potassium phosphate, or mixtures of such compounds. In general, the alkaline hydroxides or salts of the alkalies or alkaline earth metals are capable of use in accordance with my invention, such alkaline reagents being herein termed strong bases.

For example, about 100 grams of shellac may be introduced into about 500 cubic centimeters of water which contains dissolved about 5 grams of alkaline material of the kind above specified, preferably sodium carbonate. The material used should be free from chlorides. The mixture is boiled for about an hour, resulting in complete solution of the shellac. It is probable that such "solution" involves chemical reaction involving hydrolysis of the shellac. When the alkaline material is represented by a borate (such as the tetraborate of sodium or ammonium) then a few per cent (about 10 cubic centimeters) of concentrated ammonium hydroxide is added, preferably after boiling has been carried out for about an hour. Boiling is continued thereafter for about fifteen minutes to secure complete solution and the elimination of excess ammonia. The aqueous solution thus obtained is ready for use in capacitors.

For some purposes it has been found desirable to flexibilize or plasticize electro-deposited films of resin by the addition of a plasticizing agent to the resin-containing solution from which the film is deposited. Suitable plasticizing materials have been found to include rubber latex and the alkali and ammonium soaps of fatty acids, such as the oleates, palmitates or stearates, as well as the hydrolysis products obtained by treating a vegetable oil, such as castor oil, linseed oil, cottonseed oil and cocoanut oil with an alkali. In general, while it is possible to use any water-soluble soap as a plasticizer, I prefer the use of hydrolyzed castor oil, although I do not wish to be limited thereto. A suitable castor oil product is obtained by heating to 180 to 190° C. a mixture of two hundred grams of castor oil and forty-three grams of potassium hydroxide. This product introduces plasticity in the electro-deposited resin film when used in the alkaline resin solution to a concentration as high as 10 per cent or higher. I prefer, however, to use concentrations of about three per cent of the total alkaline resin mixture.

By the use of resin-containing solutions prepared as above illustrated, it is possible to film the armature foils either before or after the materials are assembled in capacitor form. I prefer to prefilm the foils and then to assemble them in capacitors. In some cases, but not necessarily, a suitable spacing material may be present between adjacent armature elements. The capacitor assembly may be either of the roll or stacked plate type.

As typical of types of electrolytic capacitors two structures are shown in the drawing. In the roll type structure in Fig. 1 the armatures 1, 2 are not only filmed but are separated also by the spacers 3, 4 which consist of paper, cheesecloth or other suitable porous material. Terminals 5, 6 are provided for the armatures. In the stack type capacitor of Fig. 2 the armatures 7, 8 are film-coated but no spacers other than the resin films on the armatures 7, 8 are present. The resin films are indicated by the dotted outlines 9, 10. They may be so thin and transparent as not to be evident to the eye.

The particular type of capacitor armatures will depend to some extent on the voltage application desired. For use on direct current circuits, the armatures may consist of copper, aluminum, iron or nickel or any suitable base metal. A metal of the "film-forming" type such as aluminum or tantalum is not requisite. For use on alternating current circuits, at least one armature must be of the film-forming type, aluminum being preferred.

When the resin-containing solution is electrolyzed under direct current voltage, the resin film deposits on the anode. When the deposition is being made on a non-filming metal, for example, on copper, a temperature in the range of about 80 to 95° C. is preferred. When the deposition is being made on a film-forming metal as aluminum, a lower temperature in the range of about 35 to 45° C. is preferred in order to reduce the normal electrolytic oxide filming of the base metal to as small an amount as possible.

When a shellac film is deposited from solution under alternating current voltage different conditions must be observed. When two copper electrodes are used with alternating current an unsatisfactory film is obtained on both electrodes. When at least one electrode is of the "film-forming" type, however, satisfactory films are obtained. An explanation which I believe to be true is that the resin deposits on the anode during half wave impulses but is removed during the rapid alternating current reversals of polarity with the result that a pulpy, loosely adhering resin film poorly adapted for capacitor use is obtained. When at least one of the armatures is film-forming, however, rectification results with the formation of a dense resin film on both armatures, interspersed with an oxide film on that electrode which is a film-forming nature. For alternating current circuits, I prefer to employ one armature of copper, and one armature of aluminum.

In the electrolytic shellac film formation on metals, either high or low alternating or direct current voltages may be used following the described precautions. The thickness of the resin film deposited will depend on the deposition conditions of temperature and voltage. Films of shellac may be prepared with a thickness from .025 to 4 mils (.000025 to .004 inch). When voltage is applied to the unfilmed armatures immersed in the aqueous resin solution a current flows, the magnitude of which depends on the filming conditions of voltage and armature area. This current rapidly falls to a negligibly low value characteristic of the voltage used. When the voltage is increased to a higher value, the current again rises temporarily, again falling almost at once to a low and negligible value. It is possible to deposit shellac films of satisfactory characteristics from the solution described under voltages as high as 500 volts direct current without sparking or other detrimental effects.

The resin-filmed foils are preferably used in capacitors with the electrolyte consisting of the one per cent sodium carbonate-shellac solution already described. While I have illustrated my invention with reference to the sodium carbonate-shellac solution it is not restricted thereto. As described in the before-mentioned copending application, Serial No. 72,094, filed concurrently herewith, mineral oil and chlorinated diphenyl may be used as condenser impregnating materials.

The resin-coated foils, filmed at a suitable alternating or direct current voltage as already described, are assembled in a suitable capacitor assembly. As already indicated each armature may be spaced from the other by means of a suitable spacer, preferably of a porous structure. As illustrative of a suitably porous spacer, paper made up of alpha cellulose and cotton and possessing the following average characteristics may be used:

Ash _____ .3% maximum
Chlorides _____ Less than 25 parts per million
Sulphates _____ None
Density _____ .45 to .55
Air resistance____ None
Conducting particles_____ Less than 10 per sq. ft.
Thickness from .001 to .003 inch.

Preferably two or three sheets of such paper spacer are used between the armatures. However, the use of a paper spacer is not essential, capacitors being satisfactory in which the foil armatures are separated only by the deposited film as stated in connection with Fig. 2.

The capacitor armatures when assembled with or without a spacer are impregnated with the electrolytic composition. A composition containing shellac is preferred. Film defects which may arise during service are automatically repaired. This is especially true when non-oxide filming foils, such as copper are used. The resin-containing electrolyte herein described, therefore, has a film-maintaining as well as a film-forming function. The electrolyte may function to maintain an oxide film on "film-forming' metal (such film also containing resin as above described) or to maintain a resin film on "nonfilming" metal.

The impregnation may be carried out at temperatures up to 90 to 95° C., preferably under applied gas pressure to prevent the evaporation of volatile constituents of the electrolyte (for example, water) is present. Capacitors so prepared when intended for direct current circuits are provided with one resin-filmed armature which is caused to function as the anode. When intended for alternating current circuits, the capacitors are provided with two resin-filmed armatures, at least one of which preferably consists of film-forming metal base, such, for example, as aluminum.

Capacitors of the type described are characterized by power factors at least as low as 10 per cent and negligible leakage characteristics. The capacity values are of the order normally associated with the heretofore known electrolytic capacitor which function as a result of the electrolytically formed oxide coating on the aluminum or other film-forming metal armatures. Capacitors of the type described function without electrical deterioration on 110 volts direct, or alternating current, circuits under continuous service.

What I claim as new and desire to secure by Letters Patent of the United States, is:

1. An electrolyte for electrolytic condensers comprising the reaction product of natural resin, a strong base, and a substantial amount of water.

2. An electrolyte for electrolytic condensers containing an electrolyte comprising the reaction product of a tree resin and a strong base, which contains a substantial quantity of water as an essential ingredient.

3. An electric condenser containing an armature element consisting of a base metal of non-filming characteristic, a coating thereon of electrolytically-deposited natural resin, and an aqueous electrolyte containing an alkali-reacted tree resin.

4. An electric capacitor containing an armature element consisting of a base metal of non-filming characteristic, a coating thereon of electrolytically-deposited natural shellac, and an electrolyte containing a borate-reacted shellac as an essential ingredient.

5. An electric capacitor containing a copper armature element, a coating thereon of electro-deposited shellac having a thickness within a range of .025 to 4 mils, a cooperating armature element and an aqueous electrolyte containing an alkali-reacted shellac composition.

6. An electrolytic condenser comprising one or more base metal armatures, at least one of which is of non-filming character, a film of shellac on at least one of said armatures, a porous spacer therebetween, and an electrolyte impregnant therefor consisting of a dilute aqueous solution of borate-reacted shellac.

7. The method of preparing film-forming electrolyte composition which comprises the heating together in the presence of water a natural resin, an alkali and a hydrolyzed vegetable oil.

8. The method of preparing a resin-containing composition which comprises the heating together in the presence of water natural resin, an alkali and rubber latex.

9. An electrolytic condenser containing an electrolyte having a resin film-maintaining component comprising the reaction product of shellac and a strong base.

10. An electrolytic condenser containing an armature element consisting of a nonfilming metal, a coating of natural resin thereon and a resin film-maintaining electrolyte in contact with said element comprising a reaction product of natural resin and a strong base.

11. An electrolytic condenser containing an armature element, a coating thereon of shellac and a resin film-maintaining electrolyte in contact with said element comprising a reaction product of shellac and a strong base.

12. An electrolytic condenser containing cooperating armature elements, one of which at least consists of copper, a coating thereon of plasticized shellac and an aqueous shellac film-maintaining electrolyte in contact with said element comprising a reaction product of shellac and a strong base in the presence of water.

13. A film maintaining electrolyte comprising a borate reacted shellac composition.

14. A film maintaining electrolyte comprising a borax reacted shellac composition.

15. An electrolytic condenser containing cooperating armature elements and an electrolyte comprising an aqueous solution of a reaction product of a natural resin and a strong base.

16. An electrolytic condenser containing cooperating armature elements and an electrolyte comprising a solution in water of a reaction product of shellac and a strong base.

17. An electrolytic condenser containing cooperating aluminum armature elements, an absorbent spacer and an electrolyte permeating said spacer and comprising a dilute aqueous solution of a reaction product of shellac and borax.

18. A film-maintaining electrolyte comprising an aqueous solution of a borate-reacted shellac composition.

19. A film-maintaining electrolyte comprising an aqueous solution of a borax-reacted shellac composition.

FRANK M. CLARK.